United States Patent [19]

Teran

[11] Patent Number: 5,425,617
[45] Date of Patent: Jun. 20, 1995

[54] CONSTANT STATIC PRESSURE RUNNER IN AN AXIAL FLOW TURBINE

[76] Inventor: Antonio A. Teran, Apartado 391-2350, San Francisco de Dos Rios, San Jose, Costa Rica

[21] Appl. No.: 209,117

[22] Filed: Mar. 9, 1994

Related U.S. Application Data

[63] Continuation-in-part of Ser. No. 901,412, Jun. 19, 1992, abandoned.

[51] Int. Cl.$^6$ .............................................. F04D 3/02
[52] U.S. Cl. .................................... 415/71; 415/72; 416/176
[58] Field of Search ................. 416/176, 177; 415/71, 415/72, 75, 220, 218.1, 219.1, 221

[56] References Cited

U.S. PATENT DOCUMENTS

| | | | |
|---|---|---|---|
| 907,591 | 12/1908 | Gilday | 415/72 |
| 1,065,208 | 6/1913 | Brauer . | |
| 1,490,955 | 4/1924 | Bell . | |
| 1,494,614 | 5/1924 | McLean . | |
| 1,514,293 | 11/1925 | Lawaczeck . | |
| 2,436,246 | 2/1948 | Braga . | |
| 2,808,225 | 10/1957 | Johnson . | |
| 3,198,423 | 8/1965 | Clute . | |
| 3,692,421 | 9/1972 | Dworski . | |
| 4,080,096 | 3/1978 | Dawson . | |
| 4,146,353 | 3/1979 | Carrouset | 416/176 |
| 4,880,352 | 11/1989 | Aarestad | 415/219.1 |

FOREIGN PATENT DOCUMENTS

| | | | |
|---|---|---|---|
| 0409450 | 2/1925 | Germany | 416/177 |
| 906743 | 3/1954 | Germany . | |
| 9684 | of 1889 | United Kingdom | 415/75 |
| 0007283 | of 1905 | United Kingdom | 416/176 |

Primary Examiner—Edward K. Look
Assistant Examiner—Mark Sgantzos
Attorney, Agent, or Firm—McGlew and Tuttle

[57] ABSTRACT

A rotor is provided wherein an rotor core and a jacket cooperate to provide a continuous variation of area left for fluid transit. This continuous variation of area left for fluid transit produces a continuous axial acceleration of fluid and provides a first pressure gradient. The invention also provides simultaneously for blades having a continuously varying angle provided in the area left for fluid transit and causing a second pressure gradient. The varying of the fluid transit area and the angle of the blade are designed to have the first and second pressure gradients to be complementary and maintain the pressure of the fluid substantially constant. Such a continuous varying angle of inclination of the blades provides a continuous angular acceleration of the fluid and corresponding torque. The blades of continuously varying angle of inclination rotate together with the rotor core producing the torque.

17 Claims, 12 Drawing Sheets

CONSTANT STATIC PRESSURE RUNNER IN AN AXIAL FLOW TURBINE

This is a continuation-in-part application of application Ser. No. 07/901,412 filed Jun. 19, 1992 now abandoned.

FIELD OF THE INVENTION

The present invention relates in general to a turbine transferring energy between a moving fluid and a rotating shaft, and more specifically to the shape of an axial flow turbine which controls turbulence and which balances axial, angular and static pressures of the fluid as the fluid travels along the length of the turbine.

BACKGROUND OF THE INVENTION

Existing axial flow turbines such as Kaplan, Brauer (U.S. Pat. No. 1,065,208 6/1913), and propeller types have a specific range of pressures and fluid velocities which they can be efficiently operated in. Outside of this range these turbines will either become inefficient due to internal generation of turbulence, or cease to function because of the phenomenon known as cavitation. Such prior art axial flow turbines are unable to preclude cavitation because gradients in these turbines become too large when these turbines are operated outside their range. Further, present day turbo machine technology does not provide an axial flow turbine capable of transferring power between its rotor section and a gas while maintaining the static pressure of the gas, its density and temperature substantially constant.

Furthermore, an axial flow turbine as described by Johnson, U.S. Pat. No. 2,808,225 10/1957, does not contemplate a substantial reduction of the air axial and angular velocities. On the contrary, this turbine, as well as existing steam turbines, all work on the pressure drop and the corresponding expansion and acceleration of the gas as it moves along the length of their rotors. Due to its intended application as a high speed dental drill, the Johnson turbine does not consider efficiency as an important design criterion.

SUMMARY AND OBJECTS OF THE INVENTION

It is an object of the invention to provide an axial flow turbine design that maintains the static pressure along the rotor section of the turbine substantially constant. This feature will allow us to preclude cavitation in high pressure applications involving liquids, and will allow us to design an axial flow turbine that can be applied over a wide range of combinations of volume flow and pressure. This substantially constant static pressure along the rotor section of the turbine will also allow us, in applications involving a gas, to exchange power between the rotor and the gas without changing the static pressure, the density and the temperature of the gas.

Turbulent flow is the cause of some of the power losses in an axial flow turbine. These losses are caused by velocity, vectors in the fluid going in directions different from the desired direction which produces an inefficient power exchange between the turbine and the fluid. It is also an object of the invention to provide design criteria to minimize power losses due to turbulence in an axial flow turbine.

Cavitation occurs in applications involving a liquid when the static pressure, at any point in the turbine, drops below certain limits which are determined by the operating temperature, the vapor pressure of the liquid at the operating temperature and the gases dissolved in the liquid. Under this low static pressure the liquid forms a void or bubble of vapor which will later collapse at another point along the turbine where the static pressure increases above the limits which caused the bubble to form. The collapse of the bubble will produce a shock wave that carves or erodes the turbine at the point of collapse, causing permanent damage. Also the formation of the bubble will produce a reduction of the density and a corresponding loss of power, thus lowering the efficiency of the turbine. It is also another object of the invention to provide design criteria for the control of cavitation in an axial flow turbine.

Changes in density and temperature in a gas while the gas is exchanging power with a turbine rotor will cause loss of power and thus cause a corresponding loss of efficiency. It is yet another object of the invention to provide design criteria for minimization of thermodynamic power losses in an axial flow turbine when it is used in applications involving a gas.

According to the invention, a fixed section preferably is provided in the high static pressure side of the turbine wherein a core or hub, and a jacket or pipe cooperate to provide a variation in the magnitude of cross sectional area left for fluid transit. This variation of area left for fluid transit produces an axial acceleration of the fluid and provides a corresponding static pressure gradient. The invention also provides simultaneously, in the fixed section, for fixed helicoid blades having a varying angle of inclination with respect to the axis of the turbine and located in the area left for fluid transit. Such varying angle of inclination of the blades along the length of the fixed section provides a smooth angular acceleration of the fluid and a corresponding static pressure gradient additional to the static pressure gradient caused by the axial acceleration of the fluid mentioned above.

The invention also provides simultaneously a rotor (movable) section in the low pressure side of the turbine wherein a rotor core or hub and a rotor jacket or pipe cooperate to provide a variation in the magnitude of cross sectional area left for fluid transit. Such variation of area is designed to cause an axial acceleration of the fluid and provide a corresponding static pressure gradient opposite in sign to the variation of static pressure caused by the variation of area left for fluid transit in the fixed section. The invention also provides simultaneously (in the rotor section), for helicoid blades having a varying angle of inclination with respect to the axis of the turbine and located in the area left for fluid transit. Such blades causing an angular acceleration of the fluid opposite in sign to the acceleration caused by the blades in the fixed section, but creating a pressure gradient of the same sign as the pressure gradient created by the blades in the fixed section. In the rotor section, the pressure gradient created by the axial acceleration of the fluid is opposite in sign to the pressure gradient created by the angular acceleration of the fluid. Both of these pressure gradients in the rotor section will cancel each other and thus, the static pressure will be maintained substantially constant along the rotor section, while most of the power will be exchanged between the fluid and the rotor.

A set of different embodiments of the invention are disclosed using an axial flow turbine as noted above. Besides the features of the invention described above, all embodiments disclosed herein will provide no acceleration of the fluid at the entrance and exit points of the different sections, and will provide a sinusoidal distribution, preferably a half sinusoidal wave, of the axial and angular accelerations along the length of each section. This sinusoidal distribution of accelerations will maintain turbulence at low levels, and will also determine the shape of the hubs, the jackets and the helicoid blades.

The various features of the novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DETAILED DESCRIPTION OF THE PREFERRED EMBODIMENT

Figure 1A:
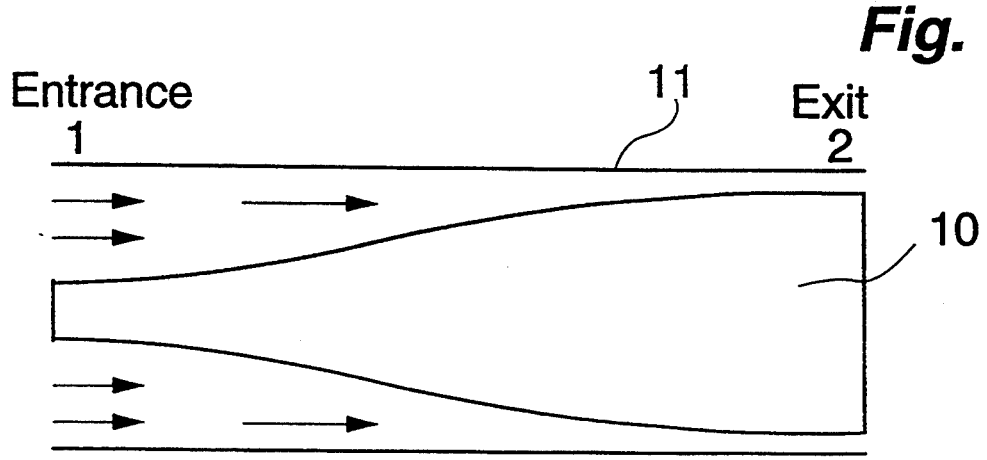
FIGS. 1a, and 1b are diagrams showing the cooperation of a hub 10 and a Jacket 11 to provide acceleration of a passing fluid, by means of a continuous reduction of the cross sectional area left for fluid transit.

Referring to the drawings, and in particular to FIGS. 1 and 2, we may appreciate how a core 10 or hub and a jacket 11 or pipe cooperate to produce an axial acceleration of the fluid and a corresponding static pressure change. The axial variation of diameters of the hub and/or the jacket cause a variation of the cross sectional area left for fluid transit. This variation of area left for fluid transit produces the changes in axial velocity of the fluid, as the fluid travels along the length or the devices. Pressure (P), velocity (V), and acceleration (A) distribution curves are shown (under the conceptual device drawings), to facilitate understanding of the changes which take place, as the fluid travels along the length of the devices.

Figure 1B:
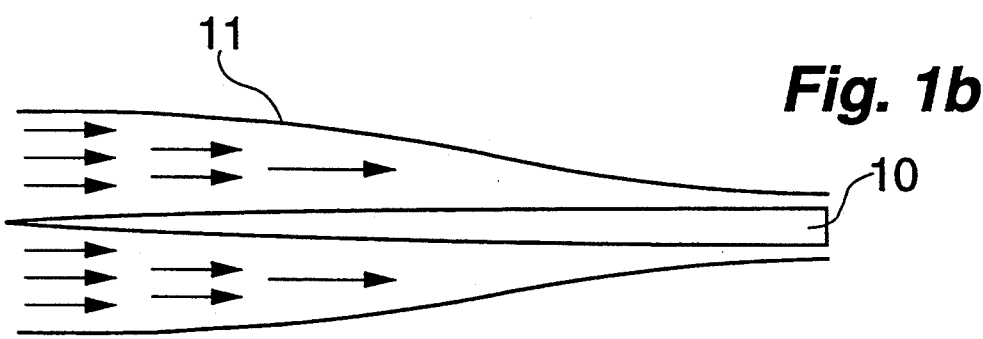
Figure 1C:
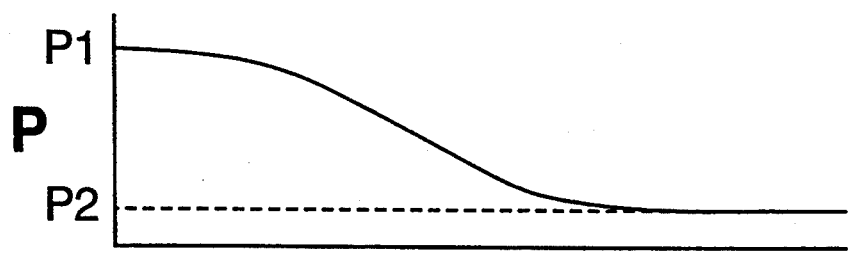
FIGS. 1c–1e are graphs of pressure, velocity, and acceleration of the fluid as it travels through the passage of FIGS. 1a or 1b from point 1 to point 2.
Figure 1D:
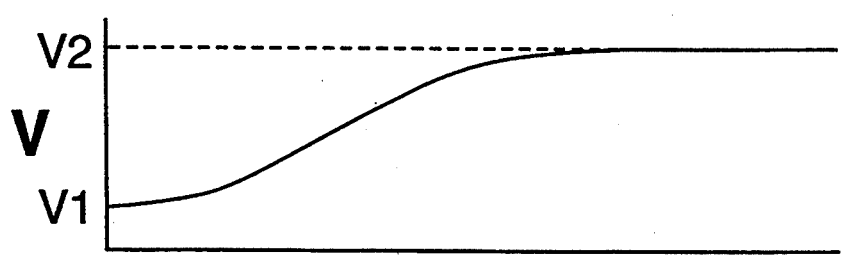
Figure 1E:
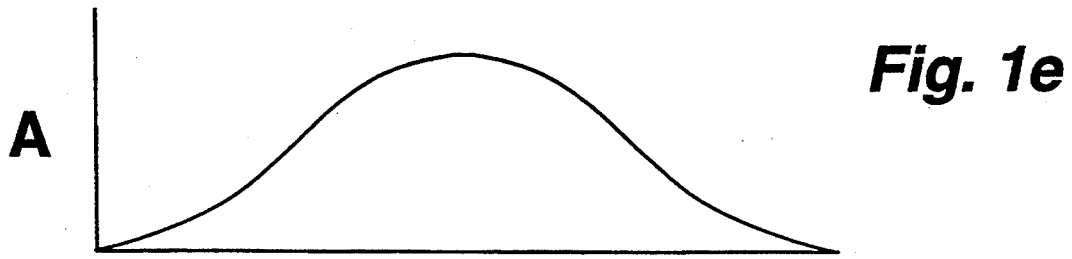

In FIGS. 1a and 1b, the fluid is accelerated and the static pressure drops as the fluid advances along the length of the device. We may say that static pressure is being converted into axial dynamic pressure. We may also say that a positive axial acceleration of the fluid and a corresponding negative static pressure change are taking place as the fluid moves along the length of the device. The changes in static pressure can be calculated according to the following formula:

$$P_2 - P_1 = \tfrac{1}{2}\sigma(V_2^2 - V_1^2) \qquad (1)$$

Where $\sigma$ represents the density of the fluid, $P_1$ and $P_2$ the static pressures at the entrance and exit points respectively, and $V_1$ and $V_2$ the axial velocities of the fluid at the entrance and exit points respectively.

The power corresponding to axial velocity ($Pow_v$) is:

$$Pow_v = \tfrac{1}{2}Fm(V_1^2 - V_2^2) \qquad (2)$$

Where Fm represents the mass rate of flow, or volume rate of flow Q times the density $\sigma$.

Figure 2A:
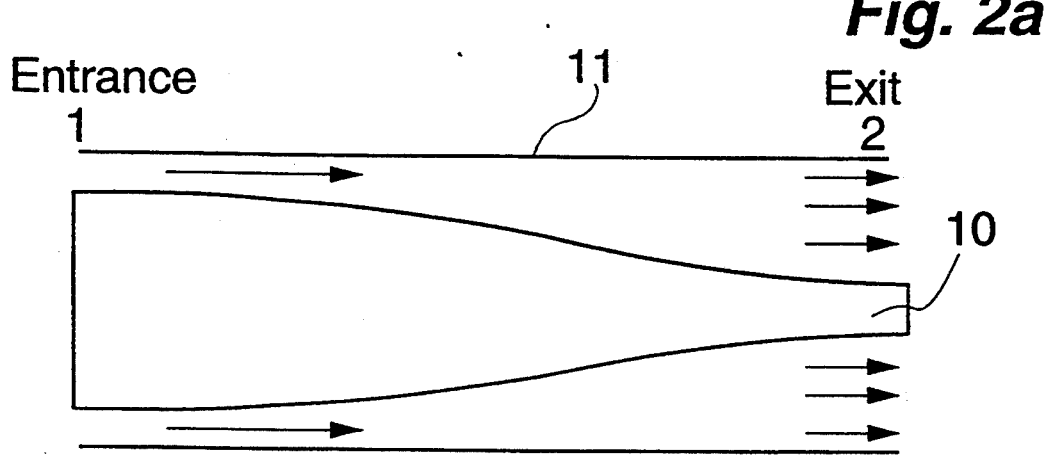
FIG. 2a and 2b is a diagram showing the cooperation of a hub 10 and a Jacket 11 to provide deceleration of a passing fluid, by means of a continuous increase of the cross sectional area left for fluid transit.
Figure 2B:
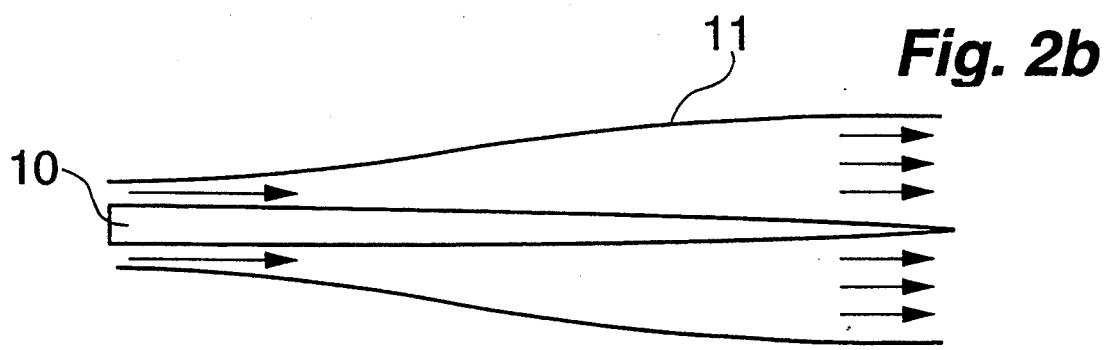
Figure 2C:
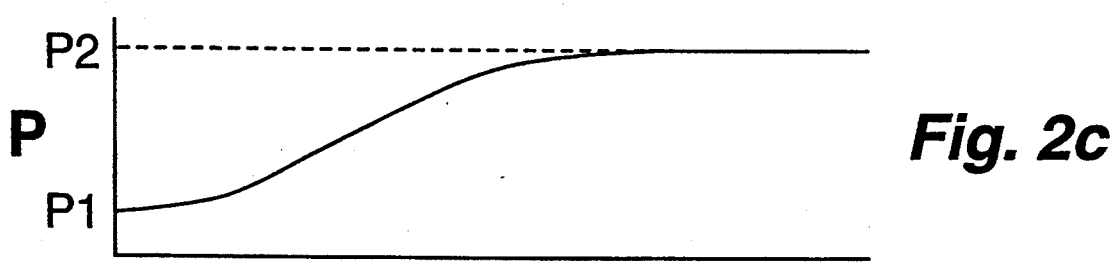
FIGS. 2c–2e are graphs of pressure, velocity, and acceleration of the fluid as it travels through the passage of FIGS. 2a or 2b from point 1 to point 2.
Figure 2D:
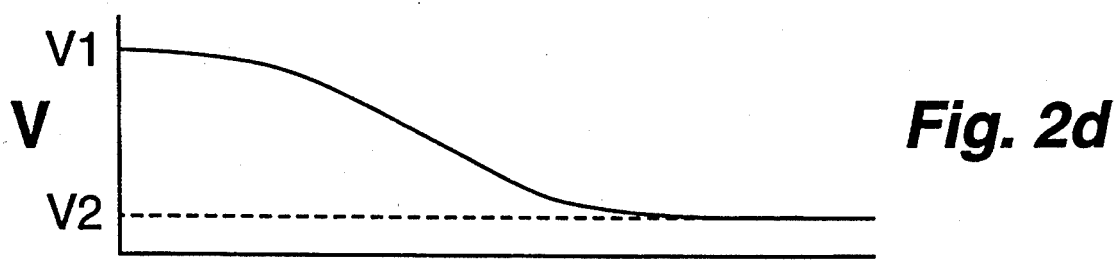
Figure 2E:
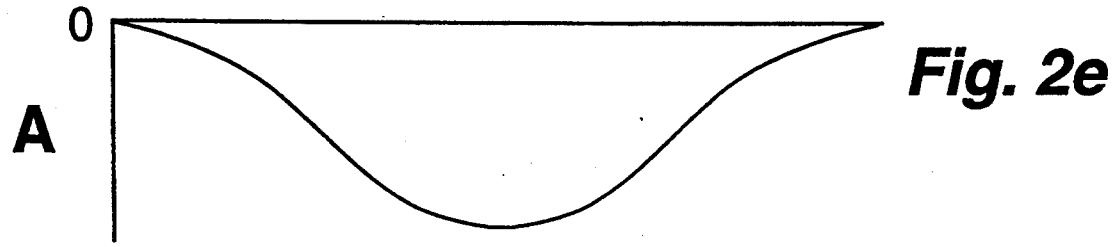

In FIG. 2a and 2b, the fluid is decelerated and the static pressure increases as the fluid advances along the length of the device. We may say that axial dynamic pressure is being converted to static pressure. We may also say that a negative axial acceleration of the fluid and a corresponding positive static pressure change are taking place as the fluid moves along the length of the device. Formula 1 can also be used to calculate the pressure change.

In the case of the fluid being axially accelerated, (as in FIG. 1) the result of Formula 1 will be negative, representing a static pressure drop. If, on the other hand, the fluid is axially decelerated (as in FIG. 2), then the result of Formula 1 will be positive, representing a static pressure increase.

Figure 6:
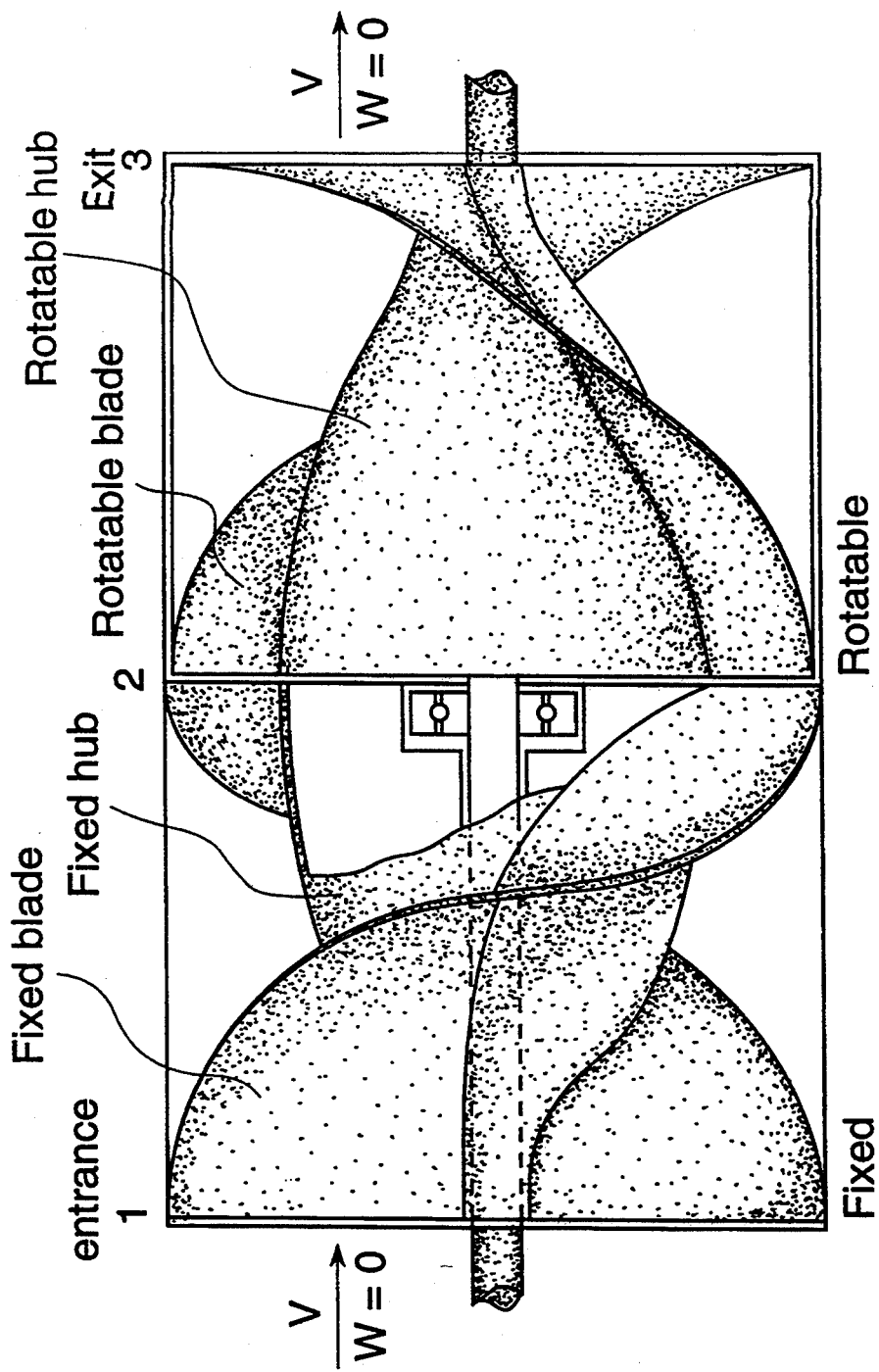
FIG. 6 is a diagram showing a turbine of the present invention.

In the fixed section of FIG. 6, we convert all the available static pressure into a well balanced set of axial and angular dynamic pressures. A set of well balanced dynamic pressures means that they are equivalent in magnitude. In other words, it means that the power represented by the change in angular velocity is equivalent to the power represented by the change of axial velocity. Therefore, as the axial and angular velocities are lowered in the rotor section (in a hydraulic motor), they will progressively cancel each other from entrance to exit. Under these conditions of dynamic pressure balance, the rotor section will not experiment a substantial static pressure variation from its entrance to its exit points. This feature of the herein proposed axial flow turbine is important for precluding cavitation in high pressure applications which deal with liquids and for maintaining substantially unaltered the thermodynamic state of the fluid in applications involving gases.

Figure 3A:
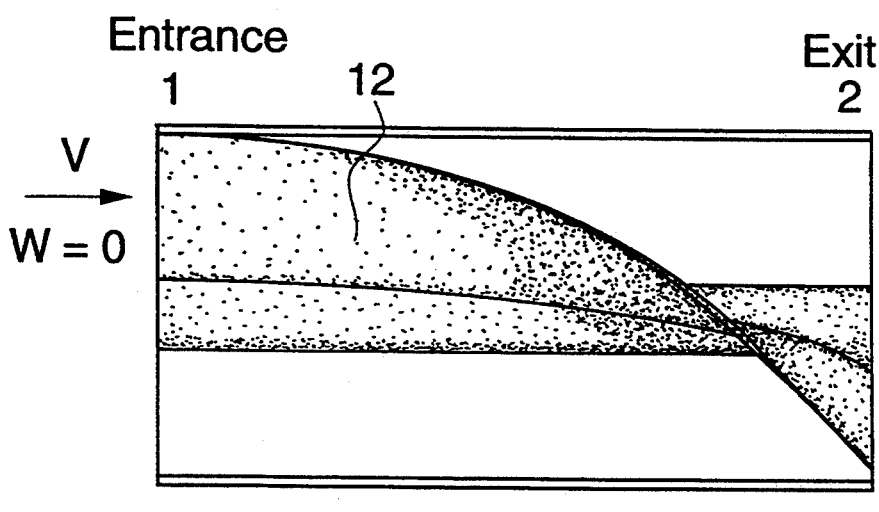
FIG. 3a is a diagram showing a fixed blade passage that angularly accelerates a passing fluid, by means of a fixed helicoid blade 12, which continuously increases its angle of inclination with respect to the axial direction.
Figure 3B:
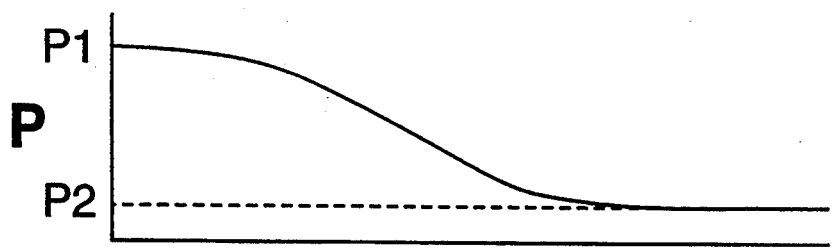
FIGS. 3b–3d are graphs of pressure, velocity, and angular acceleration of the fluid as it travels through the passage of FIG. 3a from point 1 to point 2.
Figure 3C:
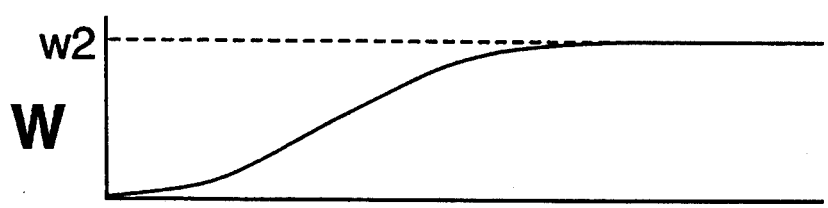
Figure 3D:
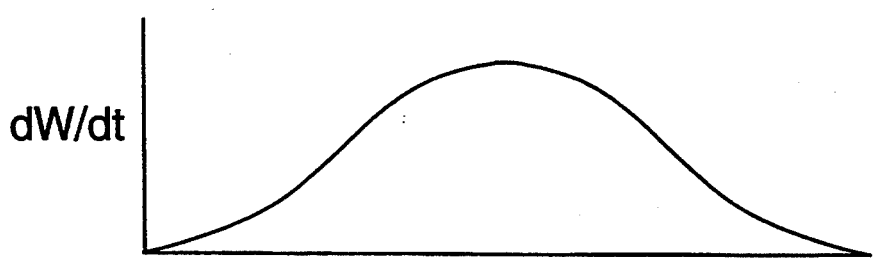
Figure 4A:
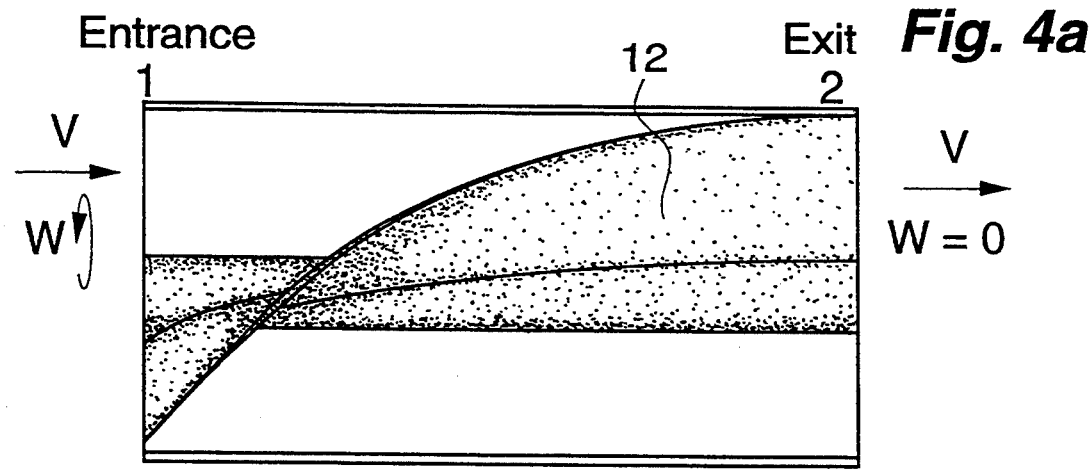
FIG. 4a is a diagram showing a fixed blade passage that angularly decelerates a passing fluid, by means of a fixed helicoid blade, which continuously decreases its angle of inclination with respect to the axial direction.
Figure 4B:
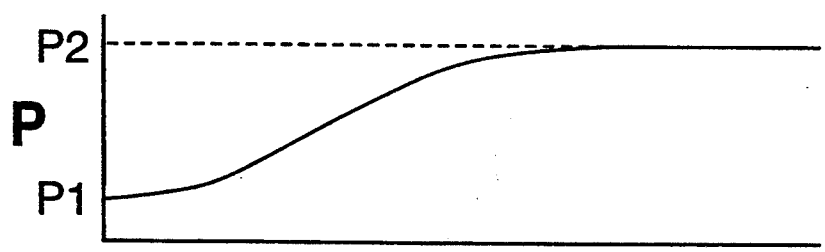
FIGS. 4b–4d are graphs of pressure, velocity, and angular acceleration of the fluid as it travels through the passage of FIG. 4a from point 1 to point 2.
Figure 4C:
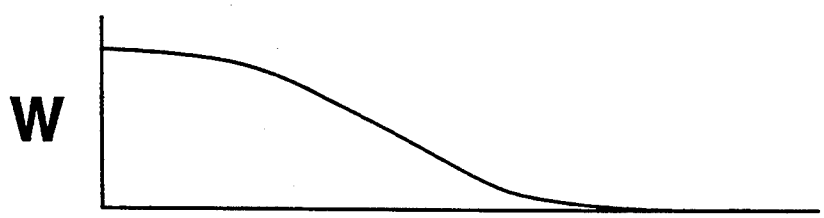
Figure 4D:
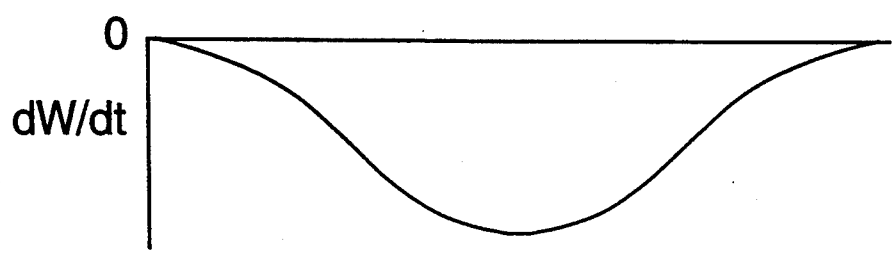
Figure 5A:
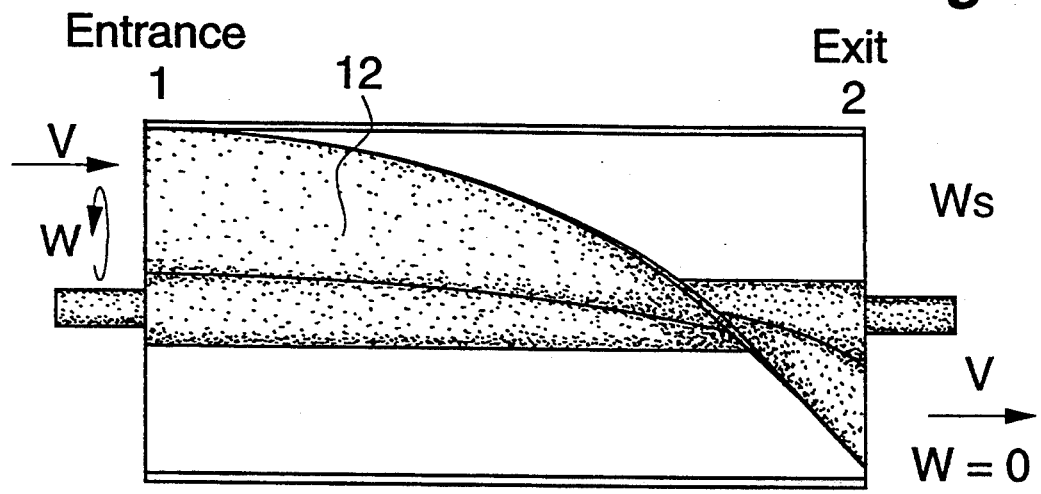
FIG. 5a is a diagram showing a rotatable blade passage that receives a fluid with an angular velocity and angularly decelerates the fluid by means of a rotatable blade which increases its angle of inclination with respect to the axial direction.
Figure 5B:
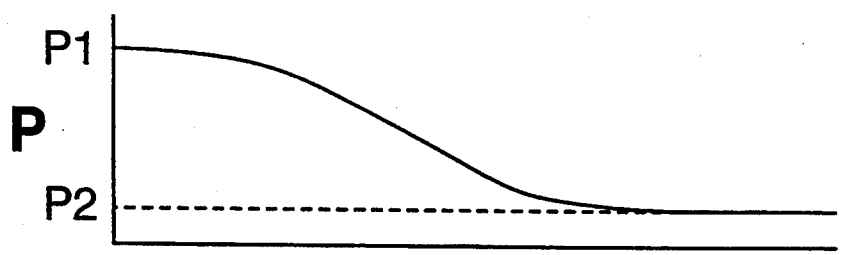
FIGS. 5b–5d are graphs of pressure, velocity, and angular acceleration of the fluid as it travels through the passage of FIG. 5a from point 1 to point 2.
Figure 5C:
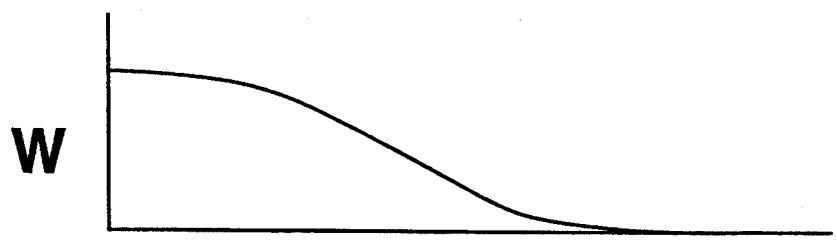
Figure 5D:
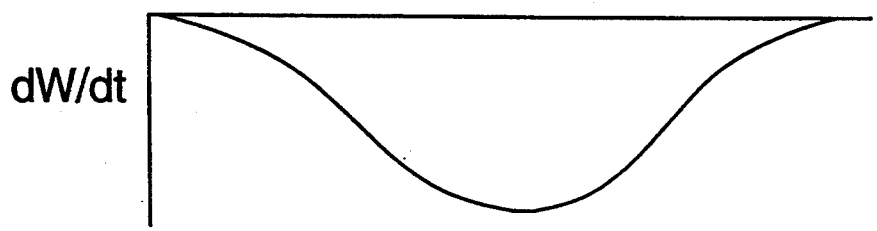

FIGS. 3a, 4a, and 5a, represent a Brauer type turbine blade, modified to include varying angle of inclination (helicoid) blades 12, instead of the helical (constant angle) blades proposed by Brauer. The varying angle of inclination of the blades will allow us to procure a smooth (controlled) angular acceleration of the fluid as it travels inside the device. No variation of the axial velocity of the fluid takes place in these arrangements, since there is no variation of the area left for fluid transit along the length of the devices and the mass flow rate must be constant. The angle of inclination of the blade 12 at any point along the axis of the device, and taken at the rotational center of mass radius Rcm, can be calculated using the following formula:

$$\alpha = \text{Arctangent}(V_t/V) \quad (3)$$

where $V_t$ is the tangential velocity of the fluid and V is the axial velocity of the fluid.

FIG. 3, represents a fixed (nonrotational) device in which the fluid enters with no angular velocity and is angularly accelerated by the blades as it travels along the length of the device. The angular acceleration of the fluid with respect to axial distance will produce a static pressure drop along the length of the device as shown in FIG. 3b. Thus, the fluid will exit the device at a lower static pressure and with angular velocity as shown in FIG. 3c. We may say that a positive angular acceleration and a corresponding negative static pressure change are taking place as the fluid travels along the length of the passage of FIG. 3a. We may also say that static pressure is being converted to angular or rotational dynamic pressure as the fluid travels along the length of the device. The pressure change can be calculated according to the following formula:

$$P_2 - P_1 = \tfrac{1}{2}\sigma(V_{t2}^2 - V_{t1}^2) \quad (4)$$

Where $V_{t1}$ and $V_{t2}$ represent the tangential velocities of the fluid as taken at an average rotational center of mass radius (Rcm). This center of mass radius can be calculated using the following formula:

$$Rcm = 2(R_e^3 - R_i^3)/3(R_e^2 - R_i^2) \quad (5)$$

Where $R_e$ represents the external radius of the fluid transit area, or the internal radius of the jacket and $R_i$ the internal radius of the fluid transit area or the external radius of the hub.

The tangential velocities can be calculated as:

$$V_t = RcmW \quad (6)$$

Where W represents the angular velocity of the fluid.

FIG. 4a represents a fixed (nonrotational) blade passage in which the fluid enters with angular velocity and exits with no angular velocity. As the angular velocity of the fluid diminishes, the static pressure increases. We may say that angular dynamic pressure is being converted to static pressure as the fluid travels along the length of the device. Formula 2 can be used to calculate the pressure change.

FIG. 5a represents a rotational device (rotor) in which the fluid enters with an angular velocity equal to the angular velocity of the blade 12 or rotor and exits with no angular velocity. As seen from outside of the device, the fluid is loosing angular velocity. But, for an observer who is rotating with the device at the upstream end, the fluid enters with no angular velocity and is being angularly accelerated in an opposite direction to the rotation of the rotor as it travels towards the exit. This angular acceleration of the fluid (as seen by the rotating observer) requires a static pressure drop. In the situation as seen from an external static observer, we are lowering the angular velocity of the fluid, and at the same time, lowering the static pressure. We may then say that a rotational dynamic pressure in combination with a static pressure drop are transferring power to the rotating device. This power Pow and the corresponding torque $\tau$ can be calculated using the following formulas:

$$Pow = Pow_w + Pow_p \quad (7)$$

$$Pow_w = \tfrac{1}{2}Fm(V_{t1}^2 - V_{t2}^2) \quad (8)$$

$$Pow_p = Q(P_1 - P_2) \quad (9)$$

Where Q represents volume rate of flow, and $Pow_w$ and $Pow_p$ represent the power corresponding to angular velocity and pressure respectively.

$$Tao = Pow/W_s$$

Where $W_s$ represents the angular velocity of the shaft.

In a Brauer type turbine as shown in FIG. 5, the change in pressure from the input to the output could cause cavitation and corresponding turbulence if it became too large. Therefore, Brauer type turbines can only operate under specific conditions where the pressure drop would not be too large.

FIG. 6 represents a turbine constructed using different combinations of the passages in FIGS. 1-5 to obtain the desired features that are being proposed in the present invention. In particular the passage of FIG. 2 is combined with the passage of FIG. 5 to form the rotor section of the turbine of the present invention. The present invention adjusts the cross sectional area of FIG. 2 and the angle of the blade in FIG. 5 in order to have the pressure gradients to be substantially complementary. Therefore the static pressure along the rotor section of the present invention will be substantially constant. The upstream and downstream portions of the rotor section can be fitted with combinations of the passages in FIGS. 1-5 in order to properly condition the fluid flowing through the rotor section in such parameters as proper cross sectional area, angular velocity, and pressure.

In FIG. 6, and particularly referring to the fixed section, the combination of the device described in FIG. 1a and 1b, especially FIG. 1a, with the device described in FIG. 3a, forms a fluid accelerator. In this fixed section, static or head pressure is converted to axial and angular dynamic pressures as the fluid travels from the entrance to the exit of this fixed section. The total static pressure drop that is converted to axial and angular dynamic pressures can be calculated by adding the results of applying formulas 1 and 4 and can be seen by combining the graphs of FIGS. 1c and 3b.

Also in FIG. 6, and particularly referring to the rotor section, we may appreciate that the rotor proper is formed by the combination of the passage described in FIG. 2a with the passage shown in FIG. 5a. As was earlier explained, the passage in FIG. 5 (a modified Brauer rotor), decelerates the fluid angularly (as seen by an external observer), but simultaneously there is a static pressure drop. Now, as indicated in the section where FIG. 2 was described, there is a static pressure increase when the fluid experiences a decrease in axial velocity. Therefore, the combination of both passages to form a rotor will produce a rotor capable of processing the fluid without substantially modifying the static pressure.

In the fixed section of FIG. 6, we convert all the available static pressure into a well balanced set of axial and angular dynamic pressures. A set of well balanced dynamic pressures means that they are equivalent in magnitude. In other words, it means that the power represented by the change in angular velocity is equivalent to the power represented by the change of axial velocity. Therefore as the axial and angular velocities are lowered in the rotor section (in a hydraulic motor), they will progressively cancel each other from entrance to exit. Under these conditions of dynamic pressure balance, the rotor section will not experience a substantial static pressure variation from its entrance to its exit points. This feature of the herein proposed axial flow turbine is important for precluding cavitation in high pressure applications which deal with liquids and for substantially maintaining the thermodynamic state of the fluid unaltered in applications involving gasses.

FIG. 6 can also represent a pump (instead of a turbine) if the direction of fluid flow is reversed. In this case, power must be applied to the shaft by an external motor. The rotor will produce axial and angular dynamic pressures in the fluid, while maintaining the static pressure substantially constant. The fixed section will subsequently convert both axial and angular dynamic pressures into static or head pressure, by diminishing the axial velocity and stopping the angular motion of the fluid.

Figure 7:
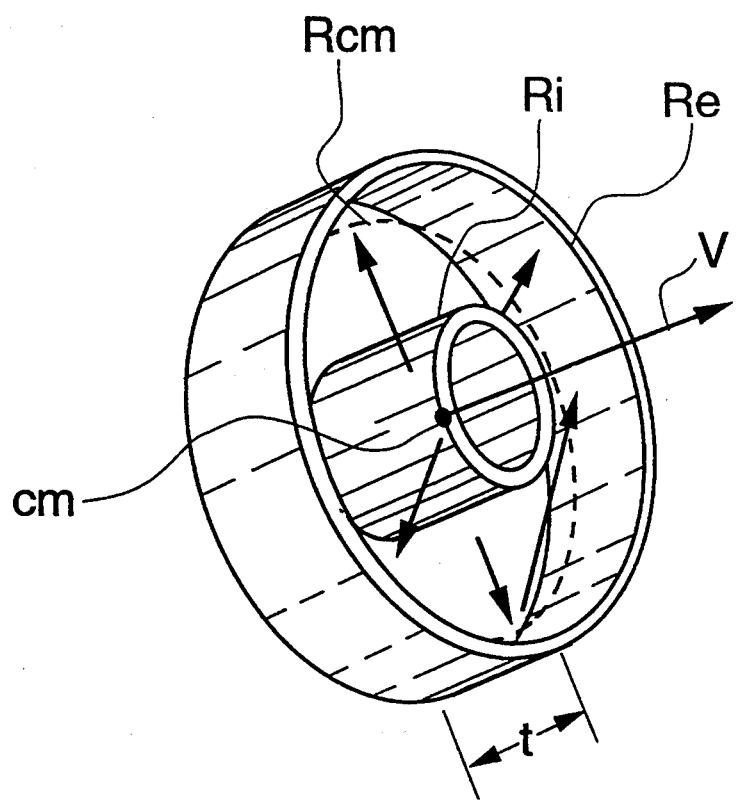
FIG. 7 is a diagram showing a mass of fluid contained between two rings.

FIG. 7 shows two concentric pipe segments which enclose a mass (m) of fluid in the shape of a ring Oust as an imaginary ring of fluid mass at any section perpendicular to the axis along the turbine shown in FIG. 6). The center of the fluid mass (symbol cm, FIG. 7) coincides with the center of both circumferences at the internal and external boundaries of the ring of fluid. Symbols $R_e$ and $R_i$ represent those external and internal radii respectively. The Rotational Center of Mass Radius (symbol Rcm) of the mass of fluid is the radius of the circumference (drawn in dotted line) between the boundaries of the ring of fluid. Symbol Rcm represents the radius of the circumference at which the mass of fluid (m) can be thought of as being concentrated for angular acceleration calculations.

By applying a static pressure on one side of the ring of mass, we produce a pressure wave traveling in the direction of the lower static pressure particles which conform our a ring of mass, increasing their motion vectors in the direction in which the wave is traveling. The final result will be that our ring of mass will start moving in the direction opposite to the higher pressure side, at a velocity proportional to the static pressure difference. If we see the set of particles as concentrated in the center of mass (cm), we may say that the center of mass has now an axial velocity. This velocity can be calculated according to the following formal:

$$V=\sqrt{(2(P_2-P_1)/\sigma)} \tag{11}$$

We may then interpret, according to the Kinetic Theory of Fluids, that by applying a pressure difference to a mass of fluid, we may have increased its energy content and this energy has been used in orienting internal micro-motion into macro-motion of the entire mass. But, the motion vectors that we have affected are only the components in the direction perpendicular to the plane of the pressure. The vector components parallel to this plane, have not been affected.

Turbulence can be considered as a set of motion vectors going in directions other than the desired direction. Micro-motion can also be considered as turbulence at particle levels. In order to orient these vectors in a particular useful direction (thus improving efficiency), we must interpose a blade that is inclined at an angle with respect to the axial motion of our ring of mass. On the surface facing higher pressure, this blade will convert static pressure to angular velocity. On the surface facing lower pressure, it will orient the radial motion components into motion components going in the axial direction. If the blade is made to cover one half of a revolution, then all radial motion vectors (regardless of their original direction) will be processed as our ring of mass travels along the axial distance covered by the blade. At the end of the blade our ring of mass will have axial and angular motion and little turbulent motion. The energy carried by the resulting axial and angular velocities can be subsequently changed to pressure or other types of energy as explained above, when describing FIGS. 1-6.

The conclusion is that a blade that extends for one half of a revolution will process motion vectors going in all possible radial directions. Also, if we use two blades in a configuration such as shown in FIG. 6, the solidity of the passage will be equal to one, and all possible axial motion vectors will be processed by the blades, as well. The result of the combination of all the considerations explained above, is the preferred embodiment of the present invention. The present invention however is not limited to only two blades. A single blade or more than two blades can be used and still incorporate the fundamental ideas set forth in this invention.

Figure 8:
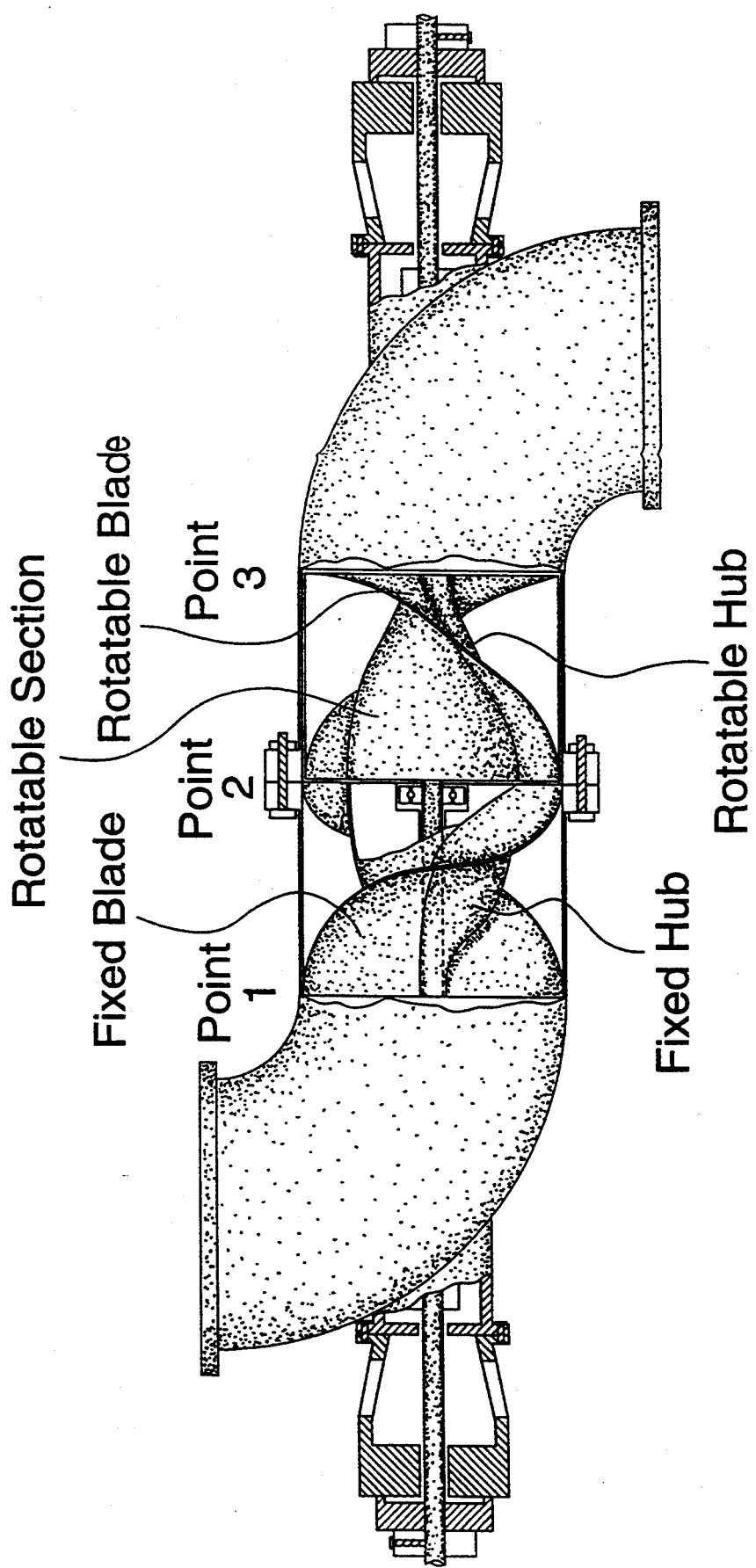
FIG. 8 is a diagram showing a turbine of the present invention used as a hydraulic motor or as a pump.
Figure 12:
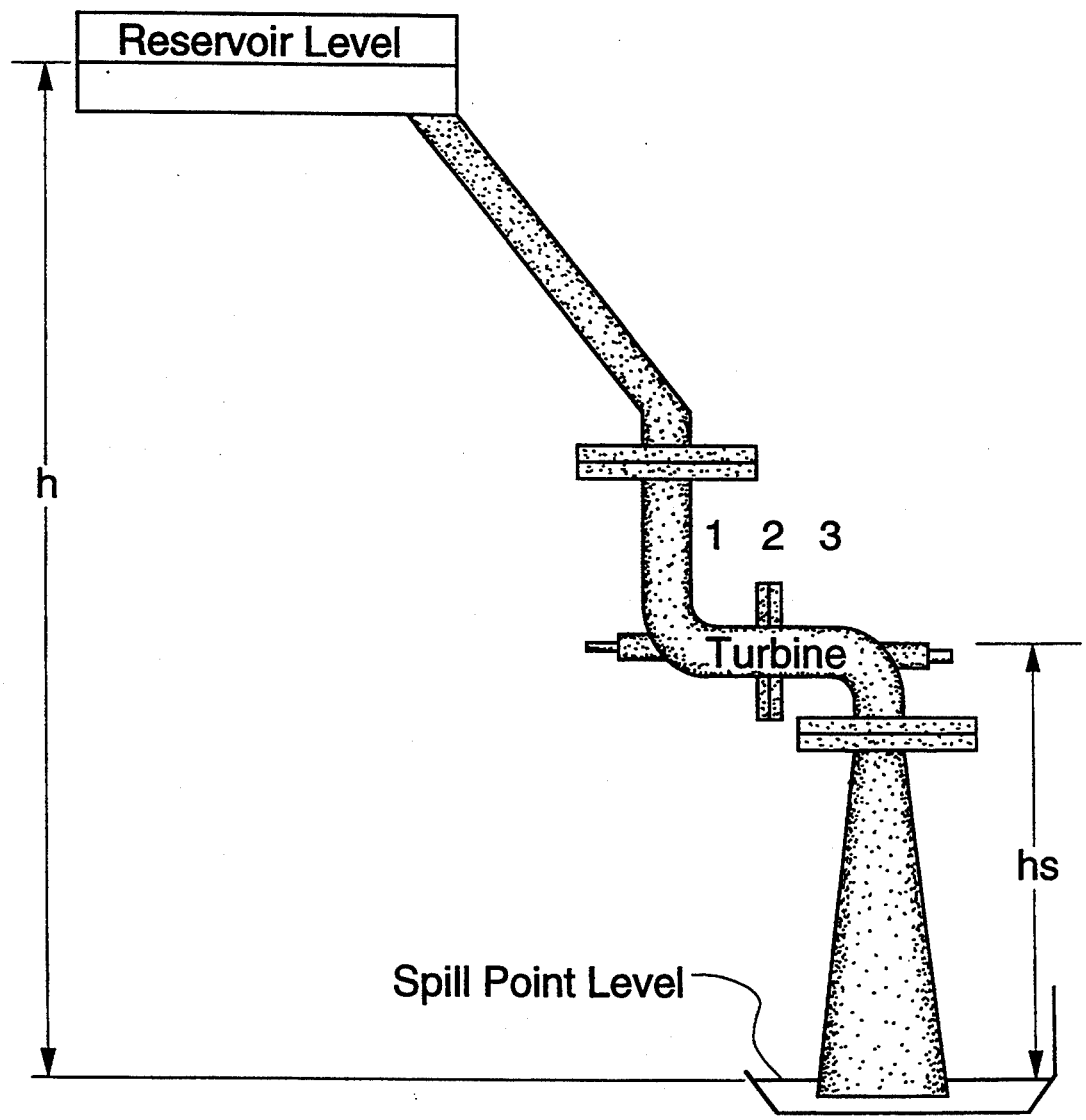
FIG. 12 is a diagram showing a turbine of the present invention used to produce power from flowing fluid.

FIGS. 8 and 12 represent a use of the turbine proposed herein as a hydraulic motor. The fixed section has blades that angularly accelerate the fluid throughout one half of a revolution. This processing of the fluid for one half of a revolution is done to make sure that all motion vectors of the fluid particles are made to go in the desired directions. The rotor section processes the fluid without substantially changing the static pressure. This substantially constant static pressure will allow for operation of the turbine without cavitation, and the minimum static pressure conditions will be determined by the height of the turbine above the spill level and the suction created by the exhaust cone (if used). Both of these conditions are under control of the designer.

In this hydraulic turbine, two elbows guide the fluid into the fixed section and out of the rotor section. They also allow the shaft to pass to the exterior, hold the seals to prevent leakage, and provide support to the shaft bearings. The same configuration can be used as a pump if the fluid direction is reversed and power is applied to the shaft.

Figure 9:
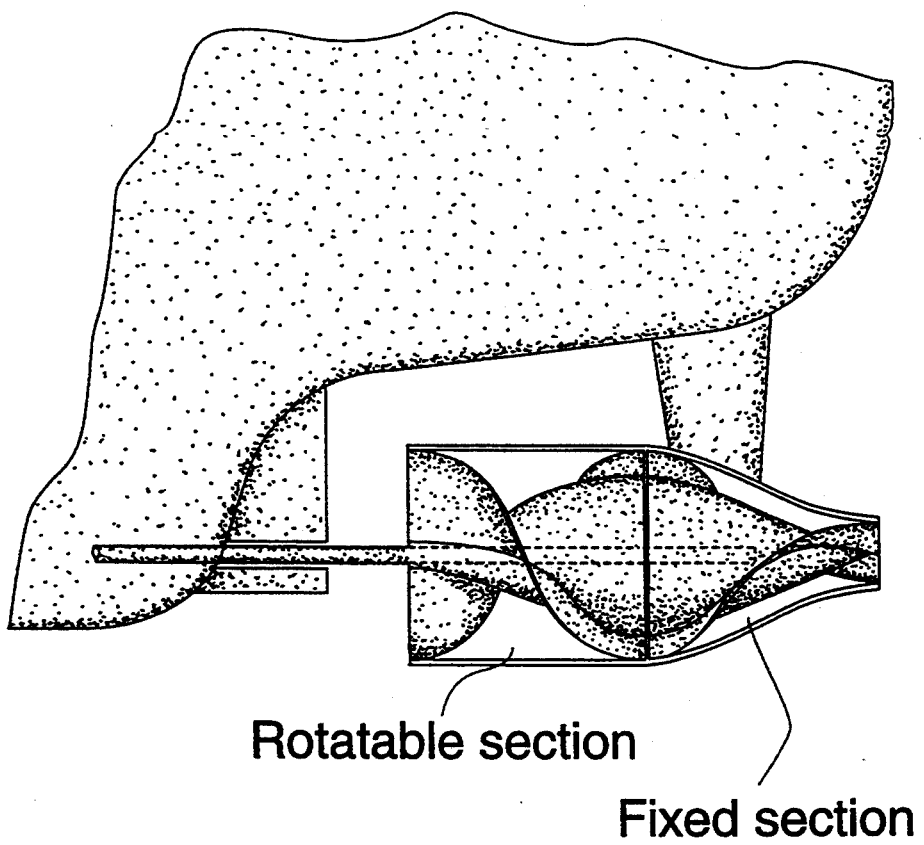
FIG. 9 is a diagram showing a turbine of the present invention used as a propeller for a water vehicle.

FIG. 9 represents the propeller for a vehicle in water. The rotor is located at the fluid entrance side and the fixed section at the fluid exit side. The rotor accelerates water axially and angularly, while maintaining the static pressure substantially constant. The fixed section will further accelerate the water axially by removing the angular component by means of blades that straighten the flow. Thus, the power available as angular velocity is converted to axial velocity by reducing the area left for fluid transit in the fixed section. The fluid will then exit the fixed section as a jet which produces thrust. The fixed section may also contain support bearings for the shaft.

Figure 10:
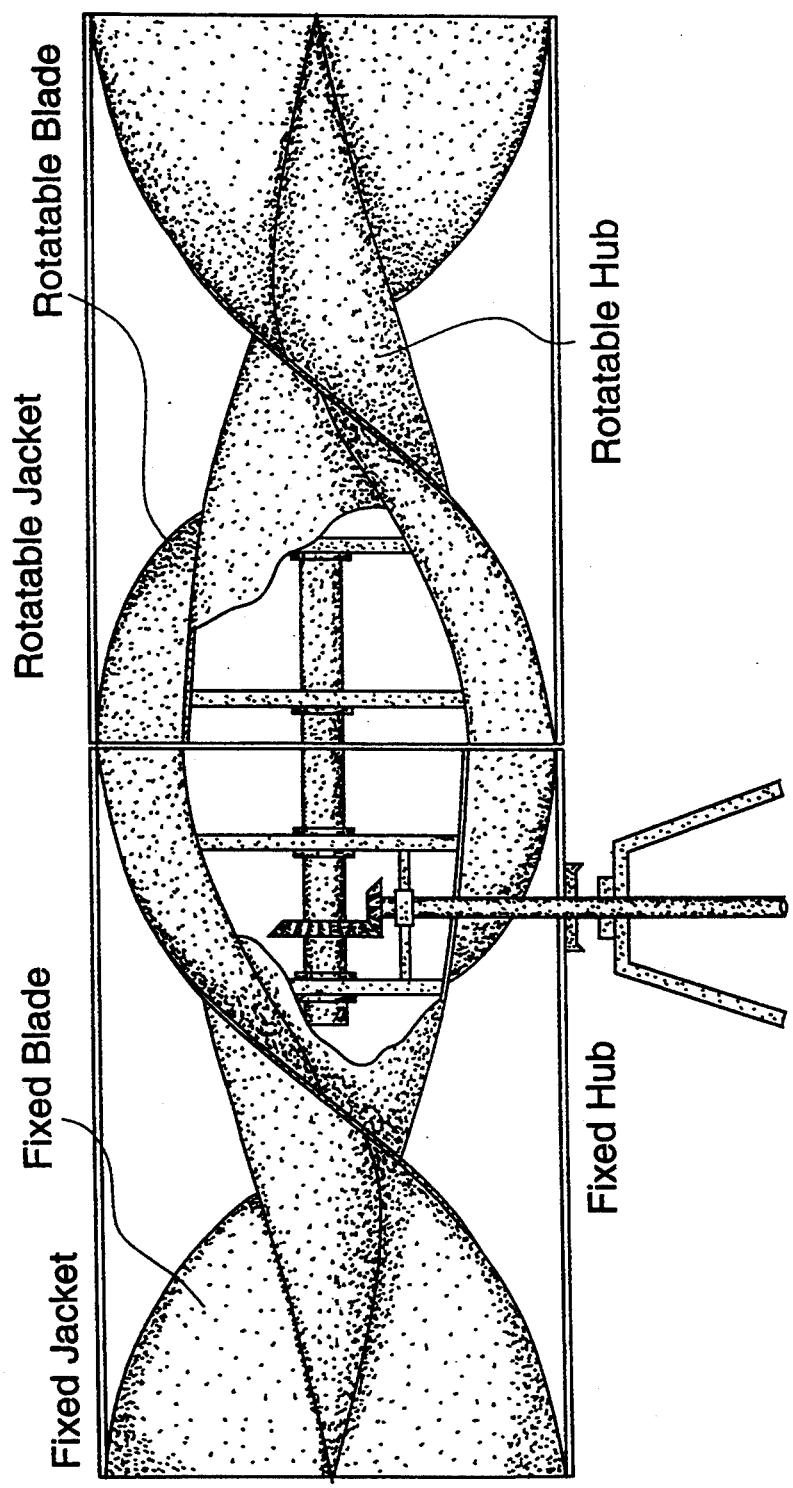
FIG. 10 is a diagram showing a turbine of the present invention used as an air driven motor or as a fan.

FIG. 10 represents an eolic application of the turbine proposed herein. This embodiment can be used as an air driven motor, and can be applied, for example, to produce electric power by attaching a generator to its shaft. The reverse is also possible and this embodiment can function as a fan if power is applied to the shaft. In this case, the direction of air flow is the reverse as in the air driven motor. Please notice that the jacket or pipe in the rotor section of this application is attached to the blades and rotates with the blades and the core. It was chosen to be attached in order to attain more rigidity of the moving structure and therefore a lighter piece.

Figure 11:
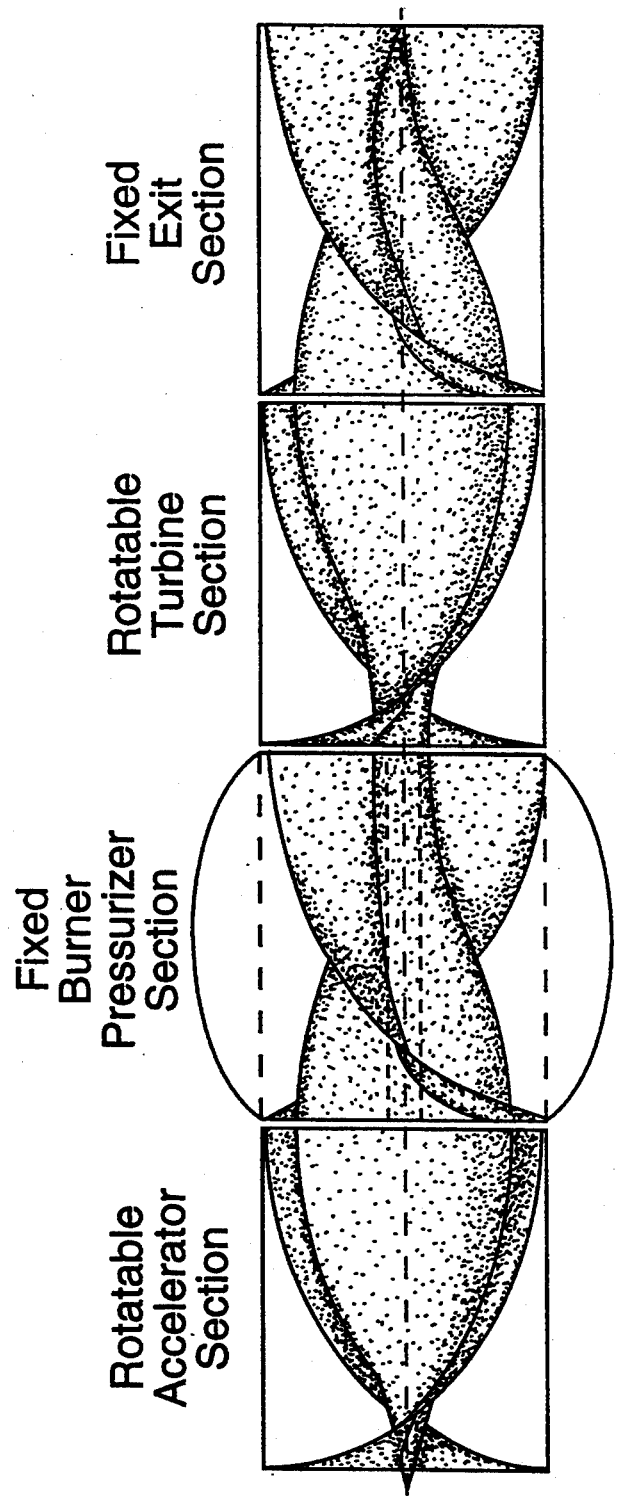
FIG. 11 is a diagram showing a turbine of the present invention used as an internal combustion engine.

FIG. 11 represents a use of the turbine proposed herein as an internal combustion engine. It is formed using two fixed sections and two rotatable sections. The rotatable sections are connected by a shaft.

The first section is the rotatable air accelerator. It is built by an increasing diameter hub with decreasing angle of inclination blades attached to it. This combination of hub and blades, in cooperation with a fixed jacket, produces angular and axial acceleration of the air while keeping the static pressure, the density and the temperature substantially constant.

Following the accelerator section is a fixed (non-moving) pressurizer section built with a cylindrical hub and diminishing angle of inclination blades attached to the hub and to the fixed external jacket. This combination of parts produces pressurization of the air by decelerating the air rotationally while keeping the axial velocity substantially constant. It is in this pressurizer section where thermal energy is added to the air, before it enters the turbine section. A small part of the air at the end of the accelerator section is taken into the burner section which surrounds the external jacket. This air is pressurized by slowing it down axially and angularly. Fuel is injected to the burner section and the products of combustion are fed into the pressurizer section through bores on the external jacket. Bearings for the shaft are included inside the hub of this section.

The rotatable turbine section is built using a combination of a cylindrical hub with increasing angle of inclination blades attached to it (a modified Brauer turbine). The hub was chosen to be cylindrical to facilitate construction and also to illustrate the possibility of different arrangements of the turbine, but a diminishing diameter hub can also be implemented in this section. The blades in this section cover one half of a revolution, in order to process all pressure wave vectors as the air moves from the entrance to the exit of the section, as was shown in other applications described above. Air enters this section at high axial velocity and with no angular velocity. It is angularly accelerated in a direction opposite to the angular velocity of the accelerator section, thus producing torque in the shaft to move the air accelerator and to produce mechanical power outside the motor.

The final section of the internal combustion engine is the fixed (nonrotatable) exit section. It is built using a diminishing diameter hub and blades of diminishing angle of inclination attached to the hub and the jacket. A small diameter cylindrical hub can be implemented in this section if the hub of the previous (turbine) section is chosen to have a diminishing diameter. Air enters this section, when built as shown in FIG. 11, at high axial velocity and high angular velocity and is slowed axially and angularly. As it is slowed, a pressure increase is obtained towards the exit point. Since the pressure outside the motor is atmospheric pressure, the pressure increase created by the blades and the hub in the exit section is seen as a suction, which signifies an additional pressure drop across the turbine section. The power given by this pressure drop is extra power available through the shaft. The hub of this section may also include bearings for the shaft.

CALCULATION SAMPLE OF A HYDRAULIC TURBINE ACCORDING TO THE INVENTION

Refer to the illustrations in FIGS. 8 and 12.

1) SYSTEM CONFIGURATION
2) GIVEN PARAMETERS

Head (h): 12 m
Power (Pow): 7.5 kw
Atmospheric Pressure (Po): 101,000 Pa
Minimum Allowable Internal Pressure (Pmin): 42,000 Pa
Fluid Velocity at the Spill Point (vs): 3 m/s
Minimum Hub Internal Radius (Rmin): 0.025 m
Water Density (a): 1000 Kg/m³
Gravitational Acceleration Constant (g): 9.78 m/s²
Turbine Height Above the Spill Point (hs): 3.61 m b) CALCULATED PARAMETERS Total available pressure ($P_{total}$) in the system configuration as illustrated in FIG. 12 is the product of the density ($\sigma$) times the acceleration of gravity (g) times the total head (h):

$$P_{total} = \sigma g h;\ 1000 \times 9.78 \times 12 = 117{,}360\ Pa \qquad (5\text{-}1)$$

Dynamic pressure ($P_s$) (due to the fluid exit velocity) at the spill point is the product of one half the density ($\sigma$) times the velocity ($V_s$) squared:

$$P_s = \sigma V_s^2 / 2;\ 1000 \times 3^2 / 2 = 4500\ Pa \qquad (5\text{-}2)$$

Maximum theoretical efficiency ($\eta$) is the difference of the total available pressure ($P_{total}$) and the dynamic pressure at the spill point ($P_s$) divided by the total available pressure ($P_{total}$).

$$\eta = (P_{total} - P_s)/P_{total};$$
$$(117{,}360 - 4{,}500)/117{,}360 = 0.9616 \qquad (5\text{-}3)$$

Note: Dynamic pressure at the spill point ($P_s$) times volume flow (Q) represent a power loss. This power loss places a maximum upper limit on the theoretical efficiency ($\eta$) that this particular application may attain.

Net available pressure ($P_N$) is the total pressure ($P_{total}$) minus the dynamic pressure ($P_s$):

$$P_N = P_{total} - P_s\ 117{,}360 - 4{,}500 = 112{,}860\ Pa \qquad (5\text{-}4)$$

Volume flow (Q) required is determined by dividing the power (Pow) by the net available pressure ($P_N$):

$$Q = Pow/P_N;\ 7{,}500/112{,}860 = 0.06645\ m^3/s \qquad (5\text{-}5)$$

The suction pressure ($P_H$) created by the turbine being above the spill point level is determined by the product of the density ($\sigma$) times the acceleration of gravity (g) times the height (hs) of the column of fluid between the turbine and the spill point level.

$$P_H = \sigma g h s;\ 1000 \times 9.78 \times 3.61 = 35,306\ Pa \quad (5\text{-}6)$$

Available working pressure (Paw) is the atmospheric pressure (Po) minus the minimum allowable internal pressure ($P_{min}$).

$$Paw = Po - P_{min};\ 101,000 - 42,000 = 59,000\ Pa \quad (5\text{-}7)$$

Maximum entrance axial dynamic pressure ($p_{v1}$) is the difference of the available working pressure (Paw) and the suction pressure (P) plus the addition of the dynamic pressure ($P_s$).

$$P_{v1} = Paw - P_H + P_s;\ 59,000 - 35,306 + 4,500 = 28,194\ Pa \quad (5\text{-}8)$$

Notes: $P_{v1}$ is the dynamic pressure due to velocity ($V_1$) of the fluid at the entrance to the turbine.

$P_s$ is the dynamic pressure due to velocity ($V_s$) of the fluid at the spill point.

Fluid entrance velocity ($V_1$) is determined by taking the square root of twice the maximum entrance axial dynamic pressure ($P_{v1}$) divided by the density ($\sigma$).

$$V_1 = \sqrt{2P_{v1}/\sigma};\ \sqrt{(2 \times 28,194/1000)} = 7.509\ m/s$$

Fluid entrance area ($A_1$) to the turbine is determined by the division of the volume flow (Q) by the entrance velocity ($V_1$).

$$A_1 = Q/V_1;\ 0.06645/7.509 = 0.008849\ m^2 \quad (5\text{-}10)$$

2) AXIAL FLOW TURBINE DIMENSIONS

Hub entrance area ($A_{H1}$) is determined by the product of $\pi$ times the square of the minimum hub internal radius ($R_{min}$).

$$A_{H1} = \pi R^2_{min};\ 3.1416 \times 0.025^2 = 0.001963\ m^2 \quad (5\text{-}11)$$

Jacket internal entrance radius ($R_e$) is determined by taking the square root of the sum of the hub entrance area ($A_{H1}$ and the fluid entrance area ($A_1$) divided by $\pi$.

$$R_E = \sqrt{(A_{H1} + A_1)/\pi}; \quad (5\text{-}12)$$

$$\sqrt{((0.001963 + 0.008849)/3.1416)} = 0.05866\ m$$

At this point, for this calculation sample, enough data is available to determine a balanced set of axial and angular dynamic pressures generated at the fixed (stator) section, before the fluid enters the rotor (movable section). $P_N$ represents all the static pressure that has to be converted to axial ($P_A$) and angular ($P_{w2}$) dynamic pressures. The power represented by the product of the volume flow (Q) and the difference of the axial dynamic pressures ($P_{v1}$), must equal the power represented by the product of the volume flow (Q) and the angular dynamic pressure ($P_w$). The balance of axial and angular pressures allows for the interchange of power between the fluid and the rotor, without substantially modifying the static pressure along the length of the rotor section. Cavitation is thus precluded by the maintenance of a constant static pressure along the rotor section.

$$P_A = \sigma(V_2^2 - V_1^2)/2 \quad (5\text{-}13)$$

$$P_{w2} = \sigma R^2_{cm} W^2_2 \quad (5\text{-}14)$$

Since both axial and angular dynamic pressures must be equal, then the axial dynamic pressure ($P_A$) is therefore equal to half of the net pressure ($P_N$).

$$P_A = P_{w2} = P_N/2;\ 112,860/2 = 56,430\ Pa \quad (5\text{-}15)$$

Axial velocity ($V_2$) will be the square root of twice the pressure Pa divided by the density ($\sigma$) plus velocity $V_1$ squared.

$$V_2 = \sqrt{(2P_A/\sigma + V_1^2)};$$
$$\sqrt{(2 \times 56,430/1000 + 7.509^2)} = 13.01\ m/s \quad (5\text{-}16)$$

Area left for fluid transit at point 2 is determined by the division of the volume flow by the velocity $V_2$.

$$A_2 = Q/V_2;\ 0.06645/13.01 = 0.00511\ m^2 \quad (5\text{-}16)$$

Dynamic pressure due to $V_2$ is one half the density ($\sigma$) times $V_2$ squared.

$$P_{v2} = \sigma V_2^2/2;\ 1000 \times 13.01^2/2 = 84,630\ Pa \quad (5\text{-}17)$$

Radius of the hub at point 2 ($R_2$) is determined as the square root of the jacket internal radius squared minus area $A_2$ divided by $\pi$.

$$R_2 = \sqrt{(R_E^2 - A_2/\pi)}; \quad (5\text{-}18)$$

Rotational center of mass radius (Rcm) is determined by taking two thirds of the quotient of the difference of the cubes of the jacket (Ro) and hub $R_2$ radii divided by the difference of their squares.

$$Rcm_2 = \frac{2(Ro^3 - R_2^3)}{3(Ro^2 - R_2^2)}; \quad (5\text{-}19)$$

$$\frac{2 \times (.05866^3 - .0426^3)}{3 \times (.05866^2 - .0426^2)} = .05105\ m$$

3) OPERATING PARAMETERS

Rearranging formula (5-14), the angular velocity at point 2 is obtained as follows:

$$W = \sqrt{(2P_{w2}/\sigma Rcm_2^2)}; \quad (5\text{-}20)$$

$$\sqrt{(2 \times 56,430/1000 \times 0.05105^2)} = 208.1\ Rad/s$$

Rotational speed would then be:

$$RPM = 30W/\pi;\ 30 \times 208.1/3.1416 = 1987\ RPM$$

Mass flow (M) is the product of the density ($\sigma$) and the volume flow (Q).

$$M = \sigma Q;\ 1000 \times 0.06645 = 66.45\ kg/s \quad (5\text{-}21)$$

Torque (Tao) is determined as the product of the mass flow (M) times the square of the rotational center of mass radius ($Rcm_2$) times the angular velocity (W).

$$Tao = MRcm_2^2 W;\ 66.45 \times 0.05105^2 \times 208.1 = 36.04\ N\text{-}m \quad (5\text{-}22)$$

Torque (Tao) is also determined as the quotient of power (Pow) and the angular velocity (W).

$$Tao = Pow/W; \; 7{,}500/208.1 = 36.04 \; N\text{-}m \quad (5\text{-}23)$$

Note: Calculating torque (Tao) using two different sets of values (formulas 5-22 and 5-23) serves the purpose of verifying most of the previous calculations that deal with pressures, velocities, volume flow, etc.

4) TURBINE CONSTRUCTION PARAMETERS

The constructional data that determine the shapes of the stator and rotor hubs and blades are obtained from a sinusoidal distribution (FIGS. 1, 2, and 3, 4, 5) of the axial and angular accelerations. This particular distribution of axial acceleration was chosen in order to obtain hubs and blades that do not change the axial and angular velocities of the fluid at the entrance and exit points of the stator and rotor sections. This keeps the generation of turbulence (at the input and output points of each section) at a minimum, since the velocities are unaltered at those points.

The procedure to determine the shape of the hubs and the blades is based on a sinusoidal distribution of the angular dynamic pressure. This angular dynamic pressure has values that vary between zero (at the entrance), a maximum value ($P_w^2$)(at the interface of stator and rotor) and back to zero (at the exit point).

a) CALCULATIONS FOR THE FIXED (STATOR) SECTION

The formula for the calculation of angular dynamic pressure (Pwx) at any point (X) along the length (L) of the stator is:

$$Pwx = P_w^2(1 + \cos(\pi x/L))/2; \quad (5\text{-}24)$$

The axial pressure (Pvx) is equal to the angular dynamic pressure plus the dynamic pressure corresponding to $V_1$.

$$Pvx = Pwx + Pv_1; \quad (5\text{-}25)$$

Axial velocity (Vx) is determined by taking the square root of twice the axial dynamic pressure (Pvx) divided by the density ($\sigma$).

$$Vx = \sqrt{(2Pvx/\sigma)}; \quad (5\text{-}26)$$

Area left for fluid transit (Ax) is the quotient of volume flow (Q) and the axial velocity (Vx).

$$Ax = Q/Vx; \quad (5\text{-}27)$$

Hub radius (Rx) is the square root of the square of the jacket radius (Ro) minus the area left for fluid transit (Ax) divided by $\pi$.

$$Rx = \sqrt{(Ro^2 - Ax/\pi)}; \quad (5\text{-}28)$$

Rotational center of mass radius (Rcmx) is two thirds of the quotient of the cube of the jacket radius (Ro) minus the cube of the hub radius (Rx) divided by the square of the jacket radius (Ro) minus the square of the hub radius (Rx).

$$Rcmx = \frac{2(Ro^3 - Rx^3)}{3(Ro^2 - Rx^2)}; \quad (5\text{-}29)$$

Angular velocity (Wx) is determined as the square root of twice the angular dynamic pressure (Pwx) divided by the density ($\sigma$) times the square of the rotational center of mass radius (Rcmx).

$$Wx = \sqrt{(2Pwx/(\sigma Rcmx^2))}; \quad (5\text{-}30)$$

Tangential velocity (Vtx) is calculated as the product of the rotational center of mass radius (Rcmx) and the angular velocity (Wx).

$$Vtx = Rcmx \, Wx; \quad (5\text{-}31)$$

Angle of inclination of the blades ($\alpha x$)(taken at the rotational center of mass radius) is the arctangent of the quotient of the axial velocity (Vx) and the tangential velocity (Vtx).

$$\alpha x = \text{Tan}^{-1}(Vx/Vtx); \quad (5\text{-}32)$$

b) CALCULATIONS FOR THE ROTOR SECTION

All the calculations for the rotor are the same as the calculations for the stator, except that the distribution of the axial and the angular dynamic pressures goes from higher to lower values. This type of distribution is done by changing the plus sign in formula 5-24 to a minus sign, as follows:

$$Pwx = Pw_2(1 - \cos(\pi X/L))/2; \quad (5\text{-}33)$$

Note: Although a sinusoidal distribution of the axial and angular accelerations was chosen for the above calculations, other acceleration distribution criteria could be chosen without departing from the essence of this Patent Application.

While specific embodiments of the invention have been shown and described in detail to illustrate the application of the principles of the invention, it will be understood that the invention may be embodied otherwise without departing from such principles.

What is claimed is:

1. An axial flow turbine comprising:
   a jacket;
   a rotor positioned inside said jacket and having a longitudinal central axis, an intake end and a discharge end, said rotor including a movable blade rotatable about said longitudinal central axis, said blade having a continuously varying angle of inclination providing means for angular acceleration of fluid in said jacket, said angular acceleration causing a first pressure gradient in the fluid, said rotor also including a rotor core, said rotor core and said jacket cooperating to define a fluid transit area, said fluid transit area having a cross-sectional area varying in magnitude from said intake end to said discharge end and provides means for changing an axial velocity of the fluid and forming a second pressure gradient which substantially counteracts said first pressure gradient caused by said angular acceleration to maintain a pressure in the fluid transit area substantially constant.

2. An axial flow turbine according to claim 1, wherein:
   said rotor and said jacket cooperate to increase said cross sectional area of said fluid transit area from said intake end to said discharge end, said increase of said cross sectional area of said fluid transit area causing a decrease in said axial velocity and an increase in said second pressure gradient of the fluid from said intake end to said discharge end;

said angular inclination of said blade increases frown said intake end to said discharge end, to decrease said first pressure gradient substantially complementary to said increase of said second pressure gradient and maintain a pressure of the fluid substantially constant from said intake end to said discharge end.

3. An axial flow turbine according to claim 2, further comprising:

a fixed section positioned at one of an upstream and downstream end of said rotor, said fixed section including a hub and jacket cooperating to vary a cross sectional area of the fluid to said magnitude of said fluid transit area of said rotor, said fixed section also including a blade to vary an angular velocity of the fluid.

4. An axial flow turbine according to claim 3, wherein:

said fixed section is positioned adjacent to said intake end of said rotor, and said jacket and said hub of said fixed section reduce said cross sectional area of the fluid as the fluid approaches said intake end of said rotor to increase axial velocity of the fluid and decrease a pressure of the fluid, said blade of said fixed section increasing angular acceleration of the fluid and decreasing said pressure of the fluid.

5. An axial flow turbine according to claim 1, wherein:

said rotor is driven and the fluid flows from said discharge end to said intake end to transfer energy from ,said rotor to the fluid.

6. An axial flow turbine according to claim 1, wherein:

said angle of inclination of said blade of said rotor extends for substantially one half of a revolution.

7. An axial flow turbine according to claim 3, wherein:

said angle of inclination of said blade of said fixed section extends for substantially one half of a revolution.

8. An axial flow turbine in accordance with claim 1, wherein:

said first and second pressure gradients balance each other to cause a constant pressure from said intake end to said discharge end.

9. An axial flow turbine comprising:

a rotor core having an outer diameter;

a jacket surrounding said rotor core, said jacket being radially spaced from said rotor core, an inner diameter of said jacket and said outer diameter of said rotor core defining a fluid transit area, said fluid transit area having a first end and having a second end, one of said inner diameter of said jacket and said outer diameter of said rotor core varying in magnitude from a first end to a second end of said fluid transit area in order to change a magnitude of a cross sectional area of said fluid transit area and create a pressure gradient in fluid flowing from said first end to said second end of said fluid transit area;

a blade positioned in said fluid transit area and rotatable about a longitudinal axis of the axial flow turbine, said blade having a varying angular inclination and corresponding angular position in said fluid transit area as said blade extends from said first end to said second end of said fluid transit area, said varying angular inclination and corresponding angular position of said blade providing means for transferring energy between said blade and the fluid in said fluid transit area by changing an angular velocity of the fluid, said changing of said angular velocity causing a pressure gradient which is substantially opposite in magnitude and direction to said pressure gradient caused by said change in magnitude of said fluid transit area and causes a pressure in said fluid transit area to be substantially constant.

10. A turbine in accordance with claim 9, wherein:

said magnitude of said cross sectional area of said fluid transit area is varied by continuously varying said outer diameter of said rotor core;

said varying inclination and corresponding angular position of said blade is continuous through said fluid transit area;

said blade is connected to one of said rotor core and said jacket.

11. A turbine in accordance with claim 9, wherein:

said blade changes an angular velocity of the fluid, said changing of said angular velocity being substantially constant from said first end to said second end of said fluid transit area.

12. A turbine in accordance with claim 9, wherein:

said positions of said blade and said magnitude of said cross sectional area of said fluid transit area cooperating to change said angular and axial velocities of the fluid and provide a substantially constant pressure in the fluid of said fluid transit area which precludes cavitation.

13. An axial flow turbine in accordance with claim 9, wherein:

a curvature of said blade and said magnitude of said cross-sectional area are varied from said first end to said second end to have respective said pressure gradients cancel each other and to have a pressure of the fluid be constant from said first end to said second end.

14. A method of maintaining substantially constant a pressure of a fluid flowing though a passage while changing an angular velocity of the fluid, the method comprising the steps of:

flowing the fluid from a first end of the passage to a second end of the passage, said flowing of fluid being in a fluid transit area;

changing an angular velocity of the fluid by providing a curved blade in said fluid transit area, said changing of said angular velocity causing a first pressure gradient;

changing an axial velocity of the fluid by varying a magnitude of said fluid transit area from said first end to said second end of said rotor to provide a second pressure gradient which counteracts said first pressure gradient caused by said changing of said angular velocity by said curved blade, and to maintain a pressure of the fluid substantially constant along said curved blade.

15. A method according to claim 14; wherein:

said changing of said magnitude of said fluid transit area is performed to maintain the fluid in a condition that precludes cavitation.

16. A method in accordance with claim 14, wherein:

said varying of said fluid transit area nullifies said first pressure gradient.

17. An axial flow turbine comprising:

a jacket;

a rotor positioned inside said jacket and having a longitudinal central axis, an intake end and a discharge end, said rotor including a movable blade rotatable about said longitudinal central axis, said blade having a continuously varying angle of inclination providing means for angular acceleration of fluid in said jacket, said angular acceleration causing a first pressure gradient in the fluid, said rotor also including a rotor core, said rotor core and said jacket cooperating to define a fluid transit area, said fluid transit area having a cross-sectional area varying in magnitude from said intake end to said discharge end and providing means for changing an axial velocity of the fluid and forming a second pressure gradient which substantially counteracts said first pressure gradient caused by said angular acceleration, said fluid flows from said intake end to said discharge end and transfers energy from the fluid to said rotor.

* * * * *

UNITED STATES PATENT AND TRADEMARK OFFICE
CERTIFICATE OF CORRECTION

PATENT NO. : 5,425,617
DATED : June 20, 1995
INVENTOR(S) : Antonio ARTIÑANO TERAN It is certified that error appears in the above-identified patent and that said Letters Patent is hereby corrected as shown below:

On the title page item,

[75] Inventor: Antonio Artiñano Teran, Apartado 391-2350, San Francisco de Dos Rios, San Jose, Costa Rica Signed and Sealed this Third Day of October, 1995

Attest:

BRUCE LEHMAN

Attesting Officer

Commissioner of Patents and Trademarks